United States Patent
Marinier et al.

(10) Patent No.: US 10,128,991 B2
(45) Date of Patent: Nov. 13, 2018

(54) METHOD AND APPARATUS FOR PERFORMING PHYSICAL DEDICATED CHANNEL ESTABLISHMENT AND MONITORING PROCEDURES

(75) Inventors: Paul Marinier, Brossard (CA); Diana Pani, Montreal (CA); Benoit Pelletier, Montreal (CA); Rocco DiGirolamo, Laval (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 814 days.

(21) Appl. No.: 12/695,377

(22) Filed: Jan. 28, 2010

(65) Prior Publication Data

US 2010/0195507 A1  Aug. 5, 2010

Related U.S. Application Data (60) Provisional application No. 61/148,789, filed on Jan. 30, 2009.

(51) Int. Cl.
| | |
|---|---|
| *H04L 12/26* | (2006.01) |
| *H04L 1/20* | (2006.01) |

(Continued)

(52) U.S. Cl.
CPC .......... *H04L 1/20* (2013.01); *H04L 1/24* (2013.01); *H04W 76/19* (2018.02); *H04L 2001/0096* (2013.01)

(58) Field of Classification Search
USPC ........................................ 370/242
See application file for complete search history.

(56) References Cited

U.S. PATENT DOCUMENTS

| | | |
|---|---|---|
| 6,463,298 B1 | 10/2002 | Sorenson et al. |
| 7,398,089 B2 | 7/2008 | Gunaratnam et al. |

(Continued)

FOREIGN PATENT DOCUMENTS

| | | |
|---|---|---|
| CN | 101212392 | 7/2006 |
| JP | 2008-546255 | 12/2008 |

(Continued)

OTHER PUBLICATIONS

Full English Translation of Umesh et al. WO2007/148629.*

(Continued)

*Primary Examiner* — Hassan Kizou
*Assistant Examiner* — Hector Reyes
(74) *Attorney, Agent, or Firm* — Quasim Shah (57) ABSTRACT

A method and apparatus are described for performing a dual-carrier operation. A first timer is initiated for an anchor carrier and a second timer is initiated for a supplementary carrier. A physical channel failure may be declared on a condition that either of the timers expire before a predefined number of in-synch indication received from a layer 1 (L1) entity is counted. Uplink transmission and enhanced dedicated channel (E-DCH) operations may be stopped on a supplementary carrier associated with the physical channel failure, but may be continued on an anchor carrier that has a physical channel established. If the physical channel failure is associated with the anchor carrier, uplink transmission and E-DCH transmission operations are stopped on all carriers.

20 Claims, 8 Drawing Sheets

(51) Int. Cl.
*H04L 1/24* (2006.01)
*H04W 76/19* (2018.01)
*H04L 1/00* (2006.01)

(56) References Cited

U.S. PATENT DOCUMENTS

| | | | |
|---|---|---|---|
| 2006/0246883 A1* | 11/2006 | Putcha | 455/419 |
| 2006/0280142 A1 | 12/2006 | Damnjanovic et al. | |
| 2008/0008212 A1* | 1/2008 | Wang et al. | 370/503 |
| 2009/0170495 A1* | 7/2009 | Blum et al. | 455/419 |
| 2009/0245178 A1* | 10/2009 | Gholmieh et al. | 370/328 |
| 2009/0303917 A1 | 12/2009 | Nakata | |
| 2009/0312056 A1* | 12/2009 | Drugge et al. | 455/561 |
| 2010/0130219 A1 | 5/2010 | Cave et al. | |
| 2010/0309840 A1* | 12/2010 | Umesh | H04L 1/0083 370/328 |

FOREIGN PATENT DOCUMENTS

| | | |
|---|---|---|
| JP | 2012-510237 | 4/2012 |
| WO | WO 2007/007574 | 1/2007 |

OTHER PUBLICATIONS

Ericsson et al., "Text Proposal for DC-HSDPA assumptions and standards impact," 3GPP TSG-RAN WG1 Meeting #53, R1-082249 (May 2008).

Ericsson, "Introduction of Dual-Cell HSDPA Operation on Adjacent Carriers," 3GPP TSG-RAN WG1 Meeting #54bis, R1-083974 (Sep. 29-Oct. 3, 2008).

Ericsson, Huawei, Nokia, Nokia Siemens Networks, Philips, Qualcomm Europe, Samsung, 3GPP R1-084031, TS 25.214 CR 0497 r4, "Introduction of Dual-Cell HSDPA Operation on Adjacent Carriers,", 3GPP TSG-RAN WG1 #54bis, Prague, Czech Republic, (Sep. 29-Oct. 3, 2008).

Ericsson, Huawei, Nokia, Nokia Siemens Networks, Philips, Qualcomm Europe, Samsung, 3GPP R1-084031, TS 25.214 CR 0497 r4, "Introduction of Dual-Cell HSDPA Operation on Adjacent Carriers,", 3GPP TSG-RAN WG1 #54bis, Prague, Czech Republic, (Sep. 29-Oct. 3, 2008) (with changes).

Huawei, "Discussion on RLF in DC-HSDPA," 3GPP TSG-RAN WG2 #63, R2-084402 (Aug. 2008).

Huawei, "RLF consideration in DC-HSDPA," 3GPP TSG-RAN WG2 Meeting #64, R2-086693 (Nov. 2008).

Huawei, 3GPP R1-084690, TS 25.212 CR 0267r5 "Introduction of Dual-Cell HSDPA Operation on Adjacent Carriers," 3GPP TSG-RAN WG1 #54bis, Prague, Czech Republic, (Sep. 29-Oct. 3, 2008).

Qualcomm Europe, 3, Vodafone, Ericsson, Nokia, Nokia Siemens Networks, Samsung, "Feasibility Study on Dual-Cell HSDPA operation," 3GPP TSG RAN #39, RP-080148 (Mar. 4-7, 2008).

Qualcomm Europe, Ericsson, Huawei, Alcatel-Lucent, Bouygues Telecom, H3G, SoftBank Mobile, eMobile, 3GPP RP-081114, "Multi-Carrier Evolution,", 3GPP TSG RAN #42, Prague, Czech Republic, (Dec. 2-5, 2008.).

Qualcomm Europe,"Dual Carrier operation for CELL_DCH," 3GPP TSG-RAN WG1 #52bis, R1-081438 (Mar. 31-Apr. 4, 2008).

Third Generation Partnership Project, "Technical Specification Group Radio Access Network; Physical Layer Procedures (FDD) (Release 7)," 3GPP TS 25.214 v7.10.0, (Dec. 2008).

Third Generation Partnership Project, "Technical Specification Group Radio Access Network; Physical Layer Procedures (FDD) (Release 7)," 3GPP TS 25.214 v7.14.0, (Dec. 2009).

Third Generation Partnership Project, "Technical Specification Group Radio Access Network; Physical Layer Procedures (FDD) (Release 8)," 3GPP TS 25.214 v8.1.0, (Mar. 2008).

Third Generation Partnership Project, "Technical Specification Group Radio Access Network; Physical Layer Procedures (FDD) (Release 8)," 3GPP TS 25.214 v8.4.0, (Dec. 2008).

Third Generation Partnership Project, "Technical Specification Group Radio Access Network; Physical Layer Procedures (FDD) (Release 8)," 3GPP TS 25.214 v8.8.0, (Dec. 2009).

Third Generation Partnership Project, "Technical Specification Group Radio Access Network; Physical Layer Procedures (FDD) (Release 9)," 3GPP TS 25.214 v9.1.0, (Dec. 2009).

Third Generation Partnership Project, "Technical Specification Group Radio Access Network; Radio Resource Control (RRC); Protocol Specification (Release 9)," 3GPP TS 25.331 V9.1.0 (Dec. 2009).

Third Generation Partnership Project, "Technical Specification Group Radio Access Network; Radio Resource Control (RRC); Protocol Specification (Release 8)," 3GPP TS 25.331 V8.9.0 (Dec. 2009).

Third Generation Partnership Project, "Technical Specification Group Radio Access Network; Radio Resource Control (RRC); Protocol Specification (Release 8)," 3GPP TS 25.331 V8.4.0 (Sep. 2008).

"Chinese Office Action", Chinese Application No. 201080005974. 9, dated Jul. 2, 2013, 8 Pages.

"Chinese Office Action (English Translation)", Chinese Application No. 201080005974.9, dated Jul. 2, 2013, 11 Pages.

"Japanese Office Action", Japanese Application No. 2014-044113, dated Dec. 16, 2014, 4 pages.

"Japanese Office Action (English Translation)", Japanese Application No. 2014-044113, dated Dec. 16, 2014, 3 pages.

Ericsson, "Introduction of Dual-Cell HSDPA Operation on Adjacent Carriers", 3GPP Tdoc R1-083974, Change Request TS 25.214 v8.3.0, 3GPP TSG-RAN WG1 Meeting #54bis, Prague, Czech Republic, Sep. 29-Oct. 3, 2008, 10 pages.

Huawei, "Discussion on Supplementary Carrier Control", 3GPP Tdoc R2-084408, 3GPP TSG-RAN WG2 Meeting #63, Jeju, South Korea, Aug. 18-22, 2008, 3 pages.

Qualcomm Europe, "DC-HSDPA Support", R2-082536; 3GPP TSG-RAN WG2 #62; Kansas City, USA, May 5-9, 2008, 3 Pages.

"[Draft] LS on RL synchronisation and failure with E-DCH in CELL_FACH", 3GPP Tdoc R1-082198, 3GPP TSG RAN WG1 Meeting #53, Kansas City, USA, May 5-9, 2008, 2 pages.

"Taiwanese Examination Notification", Taiwanese Patent Application No. 104101595, dated Nov. 12, 2015, 4 pages.

"Taiwanese Examination Notification (English Translation)", Taiwanese Patent Application No. 104101595, dated Nov. 12, 2015, 3 pages.

* cited by examiner

METHOD AND APPARATUS FOR PERFORMING PHYSICAL DEDICATED CHANNEL ESTABLISHMENT AND MONITORING PROCEDURES

CROSS REFERENCE TO RELATED APPLICATIONS

This application claims the benefit of U.S. Provisional Application No. 61/148,789 filed Jan. 30, 2009, which is incorporated by reference as if fully set forth herein.

FIELD OF INVENTION

This application is related to wireless communications.

BACKGROUND

Wireless communication systems keep evolving to meet the needs for providing continuous and faster access to a data network. In order to meet these needs, wireless communication systems may use multiple carriers for the transmission of data. A wireless communication system that uses multiple carriers for the transmission of data may be referred to as a multi-carrier system. The use of multiple carriers is expanding in both cellular and non-cellular wireless systems.

A multi-carrier system may increase the bandwidth available in a wireless communication system according to a multiple of how many carriers are made available. For instance, a dual-carrier system may double the bandwidth when compared to a single carrier system and a tri-carrier system will triple the bandwidth when compared to a single carrier system. In addition to this throughput gain, diversity and joint scheduling gains may also be expected. This may result in improving the quality of service (QoS) for end users. Further, the use of multiple carriers may be used in combination with multiple-input multiple-output (MIMO).

By way of example, in the context of third generation partnership project (3GPP) systems, a new feature called dual-cell high speed downlink packet access (DC-HSDPA) has been introduced in release 8 (R8) of the 3GPP specifications. With DC-HSDPA, a base station communicates to a wireless transmit/receive unit (WTRU) over two downlink carriers simultaneously. Besides doubling the bandwidth and the peak data rate available to WTRUs, but also has a potential to increase the network efficiency by means of fast scheduling and fast channel feedback over two carriers.

For DC-HSDPA operation, each WTRU is assigned two downlink carriers: an anchor carrier and a supplementary carrier. The anchor carrier carries all physical layer dedicated and shared control channels associated with transport channels such as the high speed downlink shared channel (HS-DSCH), the enhanced dedicated channel (E-DCH), and the dedicated channel (DCH) operations. Such physical layer channels include, by way of example, the fractional dedicated physical channel (F-DPCH), the E-DCH hybrid automatic repeat request (HARQ) indicator channel (E-HICH), the E-DCH relative grant channel (E-RGCH), the E-DCH absolute grant channel (E-AGCH), the common pilot channel (CPICH), the high speed shared control channel (HS-SCCH), and the high speed physical downlink shared channel (HS-PDSCH)). The supplementary carrier may carry a CPICH, an HS-SCCH and an HS-PDSCH for the WTRU. The uplink transmission remains on a single carrier in the current system. The high speed dedicated physical control channel (HS-DPCCH) feedback information is provided on the uplink carrier to the Node-B and contains information for each downlink carrier.

It has been proposed to extend this feature to non-adjacent downlink (DL) carriers, (e.g., carriers in different frequency bands). It has also been proposed to extend the dual-cell concept to the uplink. Thus, the WTRU may transmit on two carriers and receive on two carriers.

In wideband code division multiple access (WCDMA) and HSPA, a WTRU monitors link quality by estimating the DL dedicated physical control channel (DPCCH) or F-DPCH quality, and by monitoring the cyclic redundancy check (CRC) on the dedicated physical data channel (DP-DCH), if configured. The physical layer reports in-synch and out-of-synch indications to a radio resource control (RRC) layer in the WTRU in accordance with a particular criteria. The RRC layer processes the in-synch and out-of-synch indications and may determine that radio link failure has occurred. More specifically, if the RRC in the WTRU receives a predefined number (e.g., N313) of out-of-synch indications, the WTRU starts a predetermined timer (e.g., T315). If the WTRU does not receive a predefined number (e.g., N315) of in-synch indications before the predetermined timer expires, a radio link failure is declared.

When dual-cell (or multi-cell) operation is implemented with carriers in different frequency bands, there is a significant probability that the link quality is considerably different between the two bands. For example, if the WTRU moves indoors, and the indoor penetration characteristics are better in one of the two bands, it is possible that the radio link may be maintained in one of the two bands. When this situation arises, it is not clear how the WTRU should behave to minimize disruption of its connection to the network. There currently exists no mechanism to handle radio link failure in the context of multiple carriers.

Therefore, there exists a need for an improved method for radio link establishment and monitoring.

SUMMARY

A method and apparatus are described for performing a dual-carrier operation. A first timer is initiated for an anchor carrier and a second timer is initiated for a supplementary carrier. A physical channel failure may be declared on a condition that either of the timers expire before a predefined number of in-synch indications received from a layer 1 (L1) entity is counted. Uplink transmission and E-DCH operations may be stopped on a supplementary carrier associated with the physical channel failure, but may be continued on an anchor carrier that has a physical channel established. If the physical channel failure is associated with the anchor carrier, uplink transmission and E-DCH transmission operations are stopped on all carriers.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment.

When referred to hereafter, the terminology "base station" includes but is not limited to a Node-B, a site controller, an access point (AP), or any other type of interfacing device capable of operating in a wireless environment.

The network may assign at least one downlink and/or at least one uplink carrier as an anchor downlink carrier and an anchor uplink carrier, respectively. In multi-carrier operation a WTRU may be configured to operate with two or more carriers or also referred to as frequencies or cells. Each of these carriers may have distinct characteristics and logical association with the network and the WTRU, and the operating frequencies may be grouped and referred to as anchor or primary carrier, and supplementary or secondary carrier. Hereinafter, the terminologies "anchor carrier" and "primary carrier", and "supplementary carrier" and "secondary carrier", will be used interchangeably, respectively. If more than two carriers are configured the WTRU may contain more than one primary carrier and/or more than one secondary carrier(s). The embodiments described herein are applicable and can be extended to these scenarios as well. For example, the anchor carrier may be defined as the carrier for carrying a specific set of control information for downlink/uplink transmissions. Any carrier that is not assigned as an anchor carrier may be a supplementary carrier. Alternatively, the network may not assign an anchor carrier and no priority, preference, or default status may be given to any downlink or uplink carriers. Hereinafter, the terms "anchor carrier", "primary carrier", "uplink carrier 1", "first carrier", and "first uplink carrier", are used interchangeably herein for convenience. Similarly, the terms "supplementary carrier", "secondary carrier", "uplink carrier 2", "second carrier", and "second uplink carrier" are also used interchangeably herein. For multi-carrier operation more than one supplementary carriers or secondary carriers may exist.

Figure 1A:
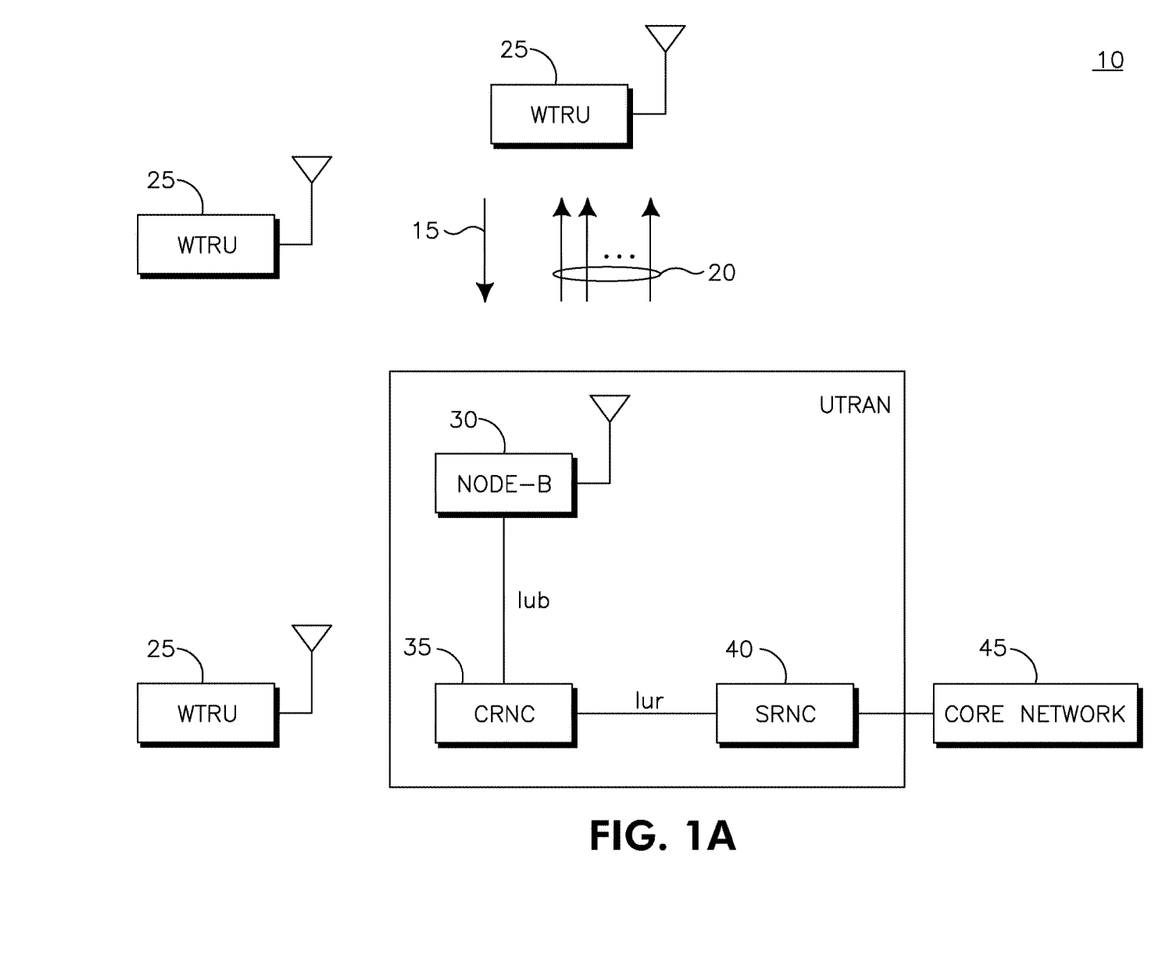
FIG. 1A shows an example of a wireless communication system in which uplink transmissions are handled using a single carrier and downlink transmissions are handled using multiple carriers.

FIG. 1A shows an example of a wireless communication system 10 in which uplink transmissions are handled using a single carrier 15 and downlink transmissions are handled using multiple carriers 20. The wireless communication system 10 includes a plurality of WTRUs 25, a Node-B 30, a controlling radio network controller (CRNC) 35, a serving radio network controller (SRNC) 40, and a core network 45. The Node-B 30 and the CRNC 35 may collectively be referred to as the UTRAN.

As shown in FIG. 1A, the WTRUs 25 are in communication with the Node-B 30, which is in communication with the CRNC 35 and the SRNC 40. Although three WTRUs 25, one Node-B 30, one CRNC 35, and one SRNC 40 are shown in FIG. 1A, it should be noted that any combination of wireless and wired devices may be included in the wireless communication system 10.

Figure 1B:
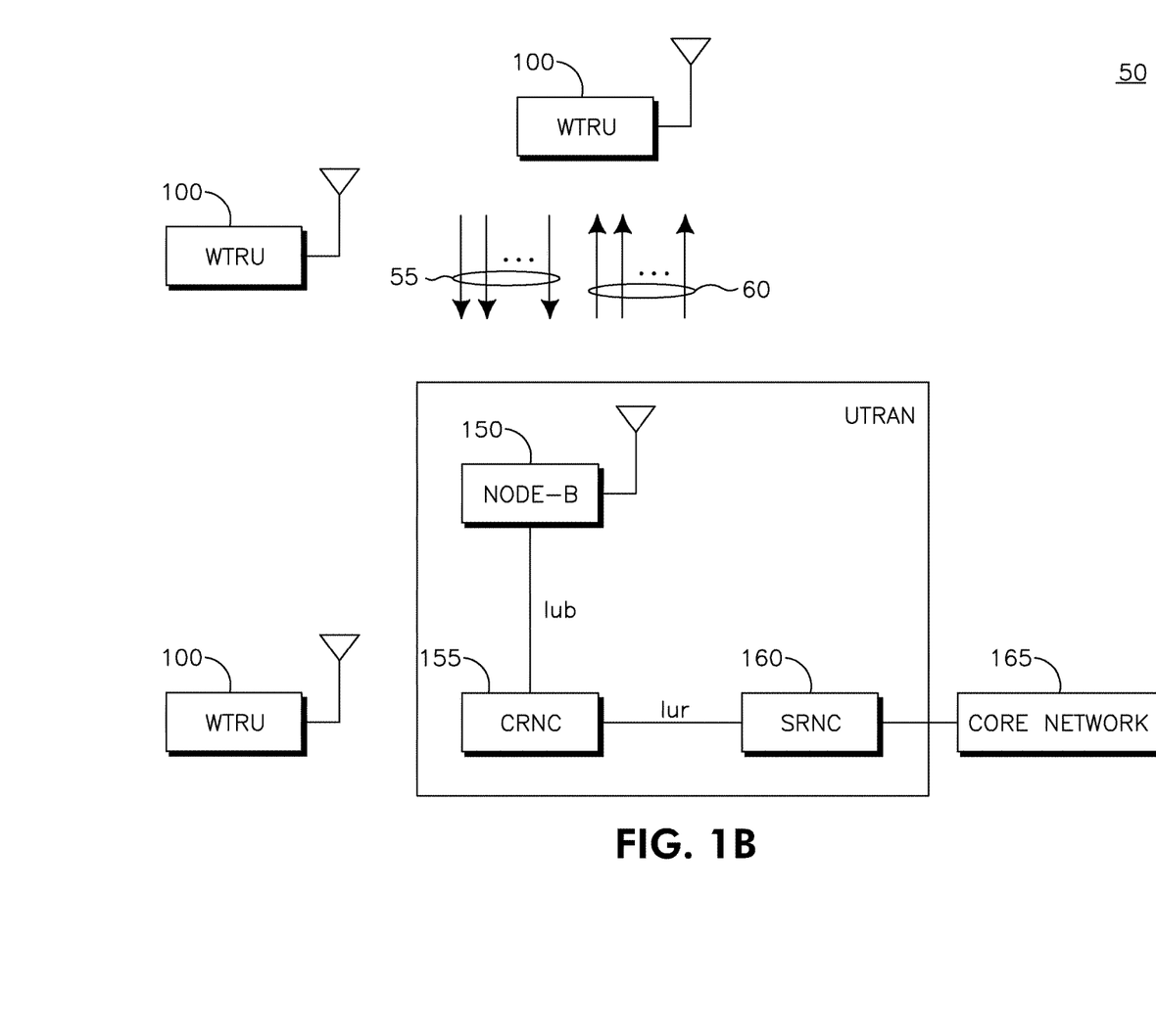
FIG. 1B shows an example of a wireless communication system in which uplink transmissions are handled using multiple carriers and downlink transmissions are handled using multiple carriers.

FIG. 1B shows an example of a wireless communications system 50 in which uplink transmissions are handled using multiple carriers 55 and downlink transmissions are handled using multiple carriers 60. The wireless communication system 50 includes a plurality of WTRUs 100, a Node-B 150, a CRNC 155, an SRNC 160 and a core network 165. The Node-B 150 and the CRNC 155 may collectively be referred to as the UTRAN.

As shown in FIG. 1B, the WTRUs 100 are in communication with the Node-B 150, which is in communication with the CRNC 155 and the SRNC 160. Although three WTRUs 100, one Node-B 150, one CRNC 155, and one SRNC 160 are shown in FIG. 1B, it should be noted that any combination of wireless and wired devices may be included in the wireless communication system 50.

Figure 1C:
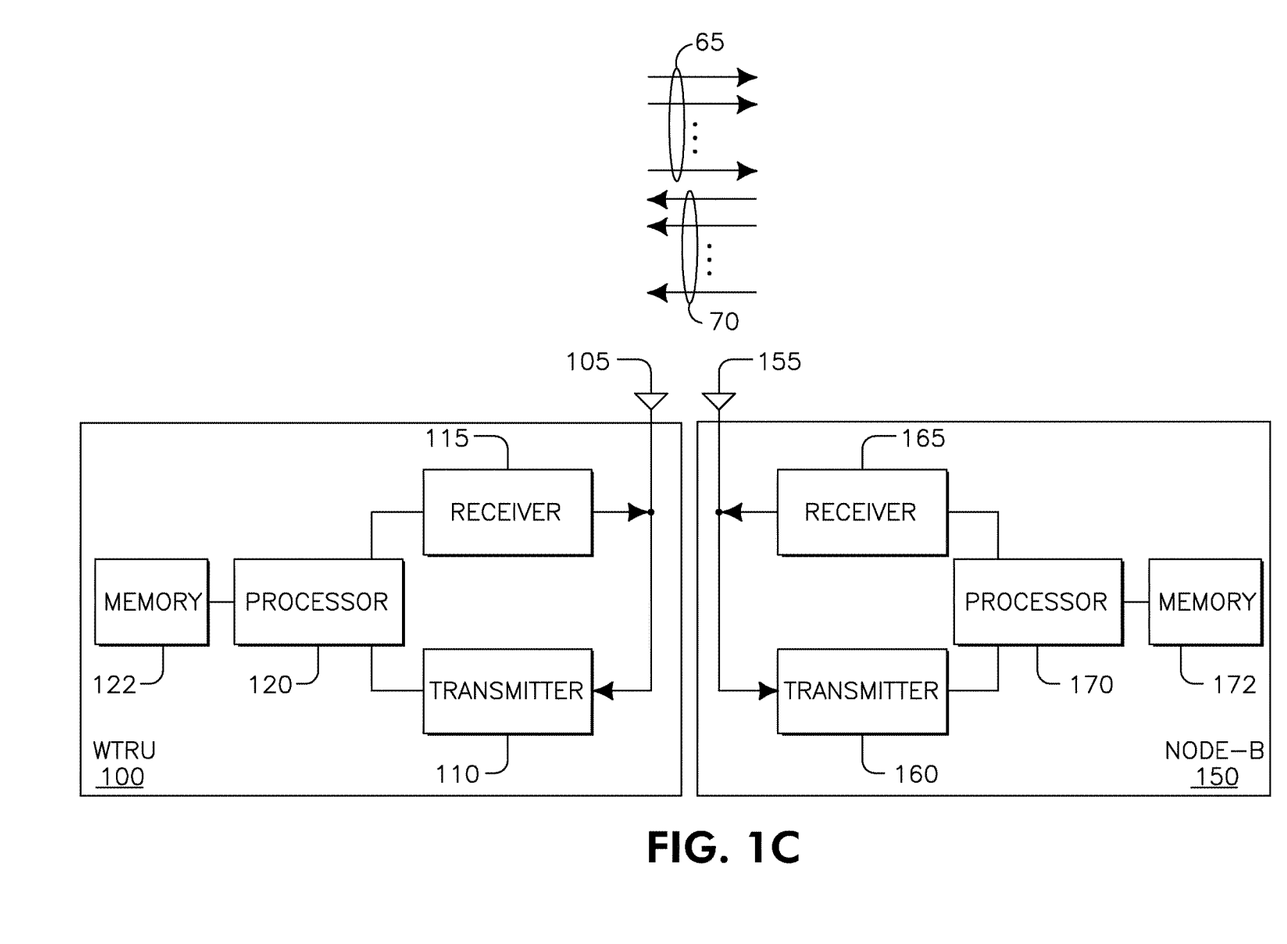
FIG. 1C shows an example of a functional block diagram of a WTRU and Node-B that reside in the wireless communication system of FIG. 1B.

FIG. 1C is a functional block diagram of the WTRU 100 and the Node-B 150 of the wireless communication system 50 of FIG. 1B. As shown in FIG. 1C, the WTRU 100 is in communication with the Node-B 150, and both are configured to perform a method wherein uplink transmissions from the WTRU 100 are transmitted to the Node-B 150 using multiple uplink carriers 65, and downlink transmissions are handled using multiple carriers 70. The WTRU 100 includes an antenna 105, a receiver 110, a transmitter 115, a processor 120, a memory 122, and other components (not shown) that may be found in a typical WTRU. The antenna 105 may include a plurality of antenna elements or a plurality of antennas may be included in the WTRU 100. The memory 122 is provided to store software including operating system and applications. The processor 120 is provided to perform, alone or in association with software and/or any one or more of the components, a method of performing uplink transmissions with multiple uplink carriers. The receiver 110 and the transmitter 115 are in communication with the processor 120. The receiver 110 and the transmitter 115 are capable of receiving and transmitting one or more carriers simultaneously. Alternatively, multiple receivers and/or multiple transmitters may be included in the WTRU 100. The antenna 105 is in communication with both the receiver 110 and the transmitter 115 to facilitate the transmission and reception of wireless data.

The Node-B 150 includes an antenna 155, a receiver 160, a transmitter 165, a processor 170, a memory 172, and other components (not shown) that may be found in a typical base station. The antenna 155 may include a plurality of antenna elements or a plurality of antennas may be included in the Node-B 150. The memory 172 is provided to store software including operating system and applications. The processor 170 is provided to perform, alone or in association with software and/or any one or more of the components, a method wherein uplink transmissions from the WTRU 100 are transmitted to the Node-B 150 using multiple uplink carriers in accordance with embodiments disclosed below. The receiver 160 and the transmitter 165 are in communication with the processor 170. The receiver 160 and the transmitter 165 are capable of receiving and transmitting one or more carriers simultaneously. Alternatively, multiple receivers and/or multiple transmitters may be included in the Node-B 150. The antenna 155 is in communication with both the receiver 160 and the transmitter 165 to facilitate the transmission and reception of wireless data.

Figure 1D:
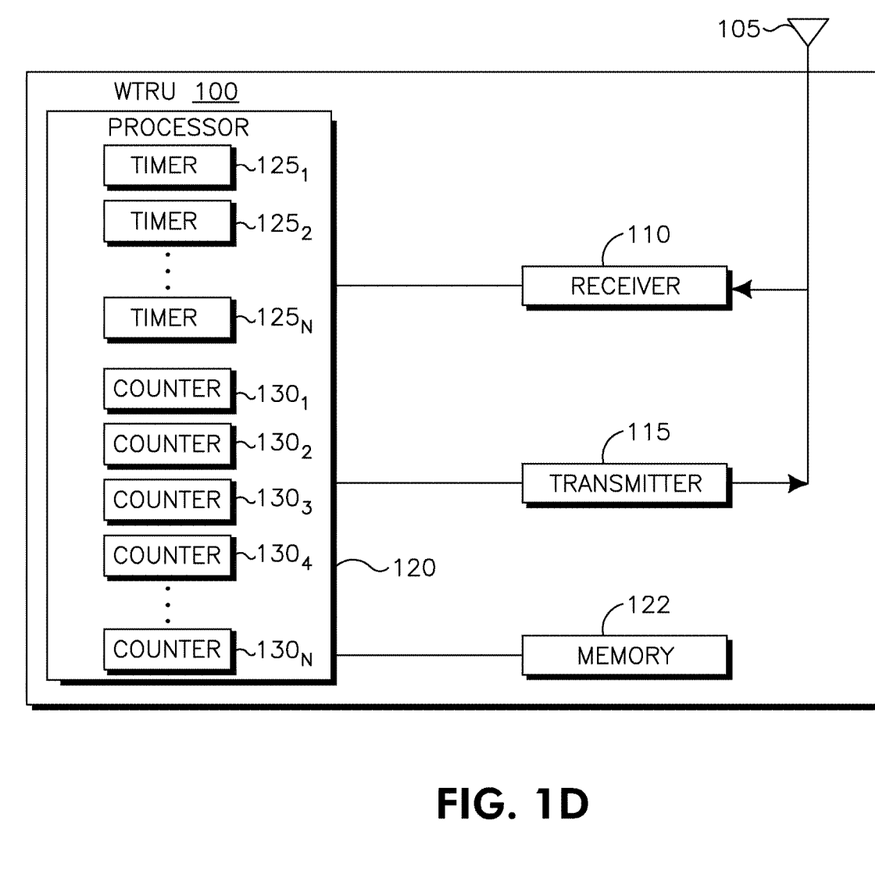
FIG. 1D shows additional details of a processor in the WTRU of FIG. 1C.

FIG. 1D shows additional details of the processor 120 in the WTRU 100. As shown in FIG. 1D, the processor 120 may include a plurality of predefined timers $125_1$, $125_2, \ldots, 125_N$ and a plurality of counters $130_1, 130_2, 130_3$ $130_4, \ldots, 130_N$.

In one scenario, a dual-carrier (i.e., dual-cell) or multi-carrier (i.e., multi-cell) operation is performed in both the uplink (UL) and DL with multiple parallel power control loops. Each DL carrier is associated with a UL carrier, and the physical channel (e.g., F-DPCH) of this DL carrier is associated with the control channel (e.g., DPCCH) of the corresponding UL carrier.

In another scenario, a dual-carrier or multi-carrier operation is performed in the DL, using at least one DL carrier that is not associated with a UL carrier for power control purposes. Thus, the physical channel (e.g., F-DPCH) is not transmitted by a DL carrier.

Radio link Establishment Procedures

If an RRC configuration message causes the WTRU 100 to be in CELL_DCH, (where dedicated channels are established and maintained to facilitate dedicated communications), and provides the WTRU 100 with a new physical channel configuration for a dual-carrier operation, the WTRU 100 may initiate a physical dedicated channel establishment procedure. Two physical dedicated channel establishment procedures may be performed by the WTRU 100. Thus, one such procedure is performed for each carrier individually.

In accordance with one method, the counters 130 are maintained separately for each carrier, (i.e., an anchor carrier and a supplementary carrier). A separate timer 125 (e.g., T312) is initiated for each of the carriers when the corresponding physical channel establishment procedure is initiated for the corresponding carrier. At least one counter 130 in the WTRU 100 determines whether a predefined number (e.g., N312) of in-synch indications received from layer 1 for each carrier has been reached to determine whether the physical dedicated channels are established. If the timer 125 (e.g., T312) expires for a particular one of the carriers before the physical dedicated channel is established, the WTRU 100 considers this as a physical dedicated channel establishment failure for the particular carrier. The WTRU 100 may declare a complete "physical channel failure" as soon as one of the carriers fails, or if both carriers fail this procedure. Alternatively, the WTRU 100 may consider a "physical channel failure" if the procedure fails on the anchor carrier, even if the supplementary carrier succeeds the physical dedicated channel establishment.

Figure 2:
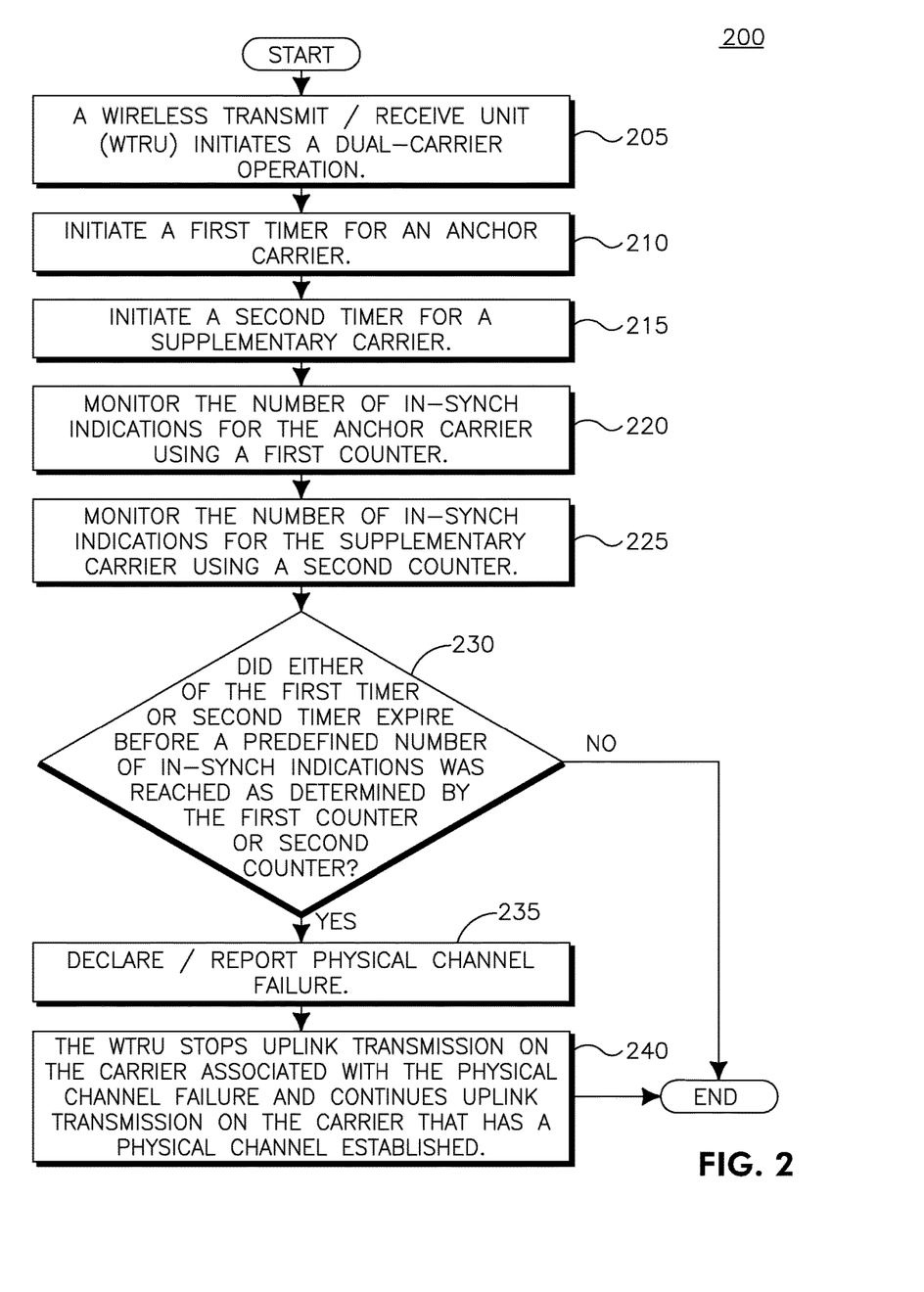
FIGS. 2, 3, 4A and 4B are flow charts of procedures for initiating a dual-carrier operation and monitoring the carriers.

FIG. 2 is a flow chart of a procedure 200 for initiating a dual-carrier operation and monitoring the carriers. The WTRU 100 initiates a dual-carrier operation (205). The WTRU may initiate dual-carrier operations following one or more explicit indications by the network, (e.g., using RRC signaling or an HS-SCCH activation order). A first timer $125_1$ (e.g., T312) in the WTRU 100 is initiated for an anchor carrier (210), (e.g., upon the reception of an explicit indication by the network, optionally at an indicated or predefined activation time). A second timer $125_2$ (e.g., T312) in the WTRU 100 is initiated for a supplementary carrier (215), (e.g., upon the reception of an explicit indication by the network, optionally at an indicated or predefined activation time). A first counter $130_1$ in the WTRU 100 is used to monitor the number of in-synch indications for the anchor carrier (220). A second counter $130_2$ in the WTRU 100 is used to monitor the number of in-synch indications for the supplementary carrier (225). A determination is then made as to whether or not either of the first $125_1$ timer or the second timer $125_2$ expires before a predefined number of in-synch indications (e.g., N312) was reached, as determined by the first and second counters $130_1$ in $130_2$ (230). The predefined number of in-synch indications may be the same or different for each of the carriers. If the predefined number of in-synch indications was not reached, a physical channel failure is declared/reported (235), and the WTRU 100 stops uplink transmission on the carrier associated with the physical channel failure and continues uplink transmission on the carrier that has a physical channel established (240). If the predefined number of in-synch indications was reached, the downlink physical dedicated channel is considered established.

In an alternate physical channel establishment method, the WTRU 100 may start a timer 125 (e.g., T312) upon the initiation of a dual-carrier physical channel establishment procedure following reception of one or more explicit indications by the network, and wait for a predefined number (e.g., N312) of in-synch indications from any of the carriers. If this criterion is fulfilled for any of the two carriers, the WTRU 100 stops the timer 125 and resets it. The physical dedicated channels are then considered established on both of the carriers. The timer 125 may be stopped and reset if a counter 130 in the WTRU 100 determines that the anchor carrier receives a predefined number (e.g., N312) of in-synch indications from layer 1 and the physical dedicated channels are considered established.

Figure 3:
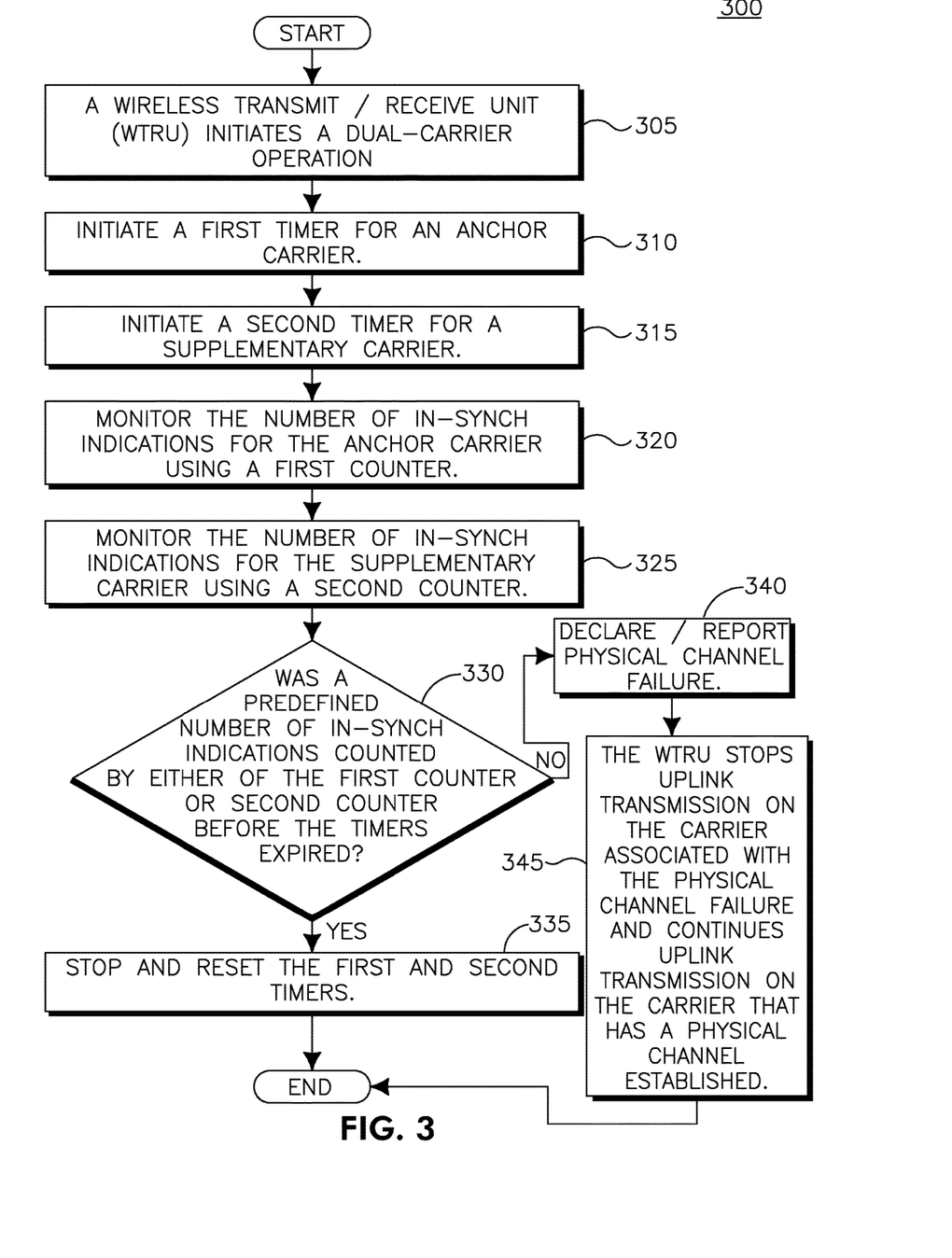

FIG. 3 is a flow chart for a procedure 300 for initiating a dual-carrier operation and monitoring the carriers. The WTRU 100 initiates a dual-carrier operation (305). A first timer $125_1$ (e.g., T312) in the WTRU 100 is initiated for an anchor carrier (310). A second timer $125_2$ (e.g., T312) in the WTRU 100 is initiated for a supplementary carrier (315). A first counter $130_1$ in the WTRU 100 is used to monitor the number of in-synch indications for the anchor carrier (320). A second counter $130_2$ in the WTRU 100 is used to monitor the number of in-synch indications for the supplementary carrier (325). Then, a determination is made as to whether or not a predefined number of in-synch indications (e.g., N312) counted by either of the first counter $130_1$ or the second counter $130_2$ was reached before the first $125_1$ timer and the second timer $125_2$ expired, respectively (330). If the predefined number of in-synch indications was reached, the first timer $125_1$ and the second timer $125_2$ are stopped and reset (335). If the predefined number of in-synch indications was not reached, a physical channel failure is declared/reported (340), and the WTRU 100 stops uplink transmission on the carrier associated with the physical channel failure and continues uplink transmission on the carrier that has a physical channel established (345).

In a universal mobile telecommunications system (UMTS), the network may configure the WTRU 100 to use "post-verification" to expedite physical channel establishment. At a high level, when post-verification is configured for conventional single-carrier operations upon initiation of the physical channel establishment procedure, the WTRU 100 starts uplink transmission immediately and verifies, after a certain period of time, (e.g., 40 ms), the quality of the downlink channel (DPCCH or F-DPCH). If the reported quality is below a threshold, the WTRU 100 stops uplink transmission and continues a synchronization procedure normally. The, the WTRU 100 waits for the downlink channel to be established to resume uplink transmission.

In dual-carrier operations, post-verification may be configured for both carriers independently. Thus, the WTRU 100 may start transmission on both uplink carriers when the physical dedicated channel establishment is initiated by the WTRU 100 on any of the two carriers. Alternatively, post-verification may be allowed on the anchor carrier, in which case the transmission on the uplink is initiated on the anchor carrier, if post-verification is configured. The WTRU 100 may initiate uplink transmission on the supplementary carrier if the physical dedicated channel establishment criterion is considered successful on the supplementary carrier or on both carriers. Otherwise, the WTRU 100 turns its transmitter 115 off and considers that post-verification failed. The WTRU 100 does not transmit on the UL and awaits higher layer orders, (e.g., an indication that the downlink physical dedicated channel is established), before resuming uplink transmission.

Once a physical dedicated channel establishment failure is detected on one of the carriers while the other carrier is considered to have the physical dedicated channel established, the WTRU 100 may stop UL transmission on the failed carrier, shut off its transmitter 115, and consider post-verification failed on this carrier, (if applicable).

The WTRU 100 may also continue transmission/reception on the carrier which has the physical dedicated channel established, or send an RRC message indicating to the network that the physical dedicated channel establishment failed on one of the carriers. The WTRU 100 may report a successful reconfiguration procedure, (i.e., RRC reconfiguration complete message). However, the RRC message may be extended to indicate that a failure occurred on one of the carriers, or that a failure occurred on the anchor carrier. Alternatively, a new RRC message may be defined to indicate a failure.

The WTRU 100 may send a measurement report that indicates such a failure, or respond with an RRC reconfiguration failure message. The failure message, however, may be extended to report that one carrier failed, (i.e., that the supplementary carrier failed, or the anchor carrier, or both). The "failure cause" may be extended to a supplementary physical channel failure, an anchor physical channel failure, or just a total physical channel failure. The WTRU 100 may report a special value of a channel quality indicator (CQI) to indicate a channel failure to the network, or refrain from reporting a CQI, (i.e., the CQI is discontinuous transmission (DTX)-ed). Alternatively, a layer 2 (L2) message may be used. Once a failure is reported to the network, the WTRU 100 may continue with single carrier operation on the successful carrier. The WTRU 100 may also stop any reception/transmission procedure on the secondary carrier as soon as the procedure fails, or wait for an explicit indication from the network.

As currently specified, for single carrier operation, once a physical channel failure occurs, the WTRU 100 may revert back to its previous configuration. However, for dual-carrier operation, the WTRU 100 may continue single carrier operation on the successful carrier even if one carrier's physical dedicated channel establishment fails. More specifically, if the anchor carrier physical channel establishment succeeds and the secondary carrier physical channel establishment fails, the WTRU may continue operations on the anchor carrier. Similarly, if the secondary carrier physical channel establishment succeeds and the anchor carrier physical channel establishment fails, the WTRU may continue operations on the secondary carrier.

Where both the anchor and supplementary carriers fail physical dedicated channel establishment, the WTRU 100 may declare a physical channel failure and report the failure on the RRC failure message. Accordingly, the WTRU 100 may then revert to the old configuration.

Alternatively, the WTRU 100 may declare physical channel failure even if one of the carriers failed. In this scenario, the WTRU 100 may act similar to the case where both carriers failed physical dedicated channel establishment.

Radio Link Monitoring with Multiple Power Control Loops

In the case where there are multiple parallel power control loops, (i.e., more than one pair of F-DPCH and DPCCH channels exchanging transmit power control (TPC) commands), the WTRU 100 may independently monitor the quality of the DL F-DPCH channel on each cell. Thus, the physical layer reports in-synch and out-of-synch indications to higher layers (e.g., the RRC layer) independently for each carrier. The criterion for reporting in-synch and out-of-synch though remains the same as for single carrier operation. In a long term evolution (LTE) system, there is no power control loop but the WTRU 100 may independently monitor the quality of each carrier from which a physical dedicated control channel (PDCCH) is decoded.

Different possibilities exist for processing the in-synch and out-of-synch indications at higher layers and the actions taken by the WTRU 100.

In the WTRU 100, separate counters 130, configured to count out-of-synch indications and in-synch indications, as well as timers 125, are maintained for each carrier. The WTRU 100 may separately determine whether there is radio link failure on either carrier by using the respective counters 130 and timers 125 pertaining to each carrier. As such, on a given carrier, a timer 125 (e.g., T313) is started upon receiving a predefined number (e.g., N313) of out-of-synch indications for this carrier, and radio link failure is determined if the timer 125 expires before a predefined number (e.g., N315) of in-synch indications are received. The values of the timer 125 and the numbers of in-synch and out-of-synch indications (e.g., N313, N315) may be the same for both carriers, or may be different.

Figure 4A:
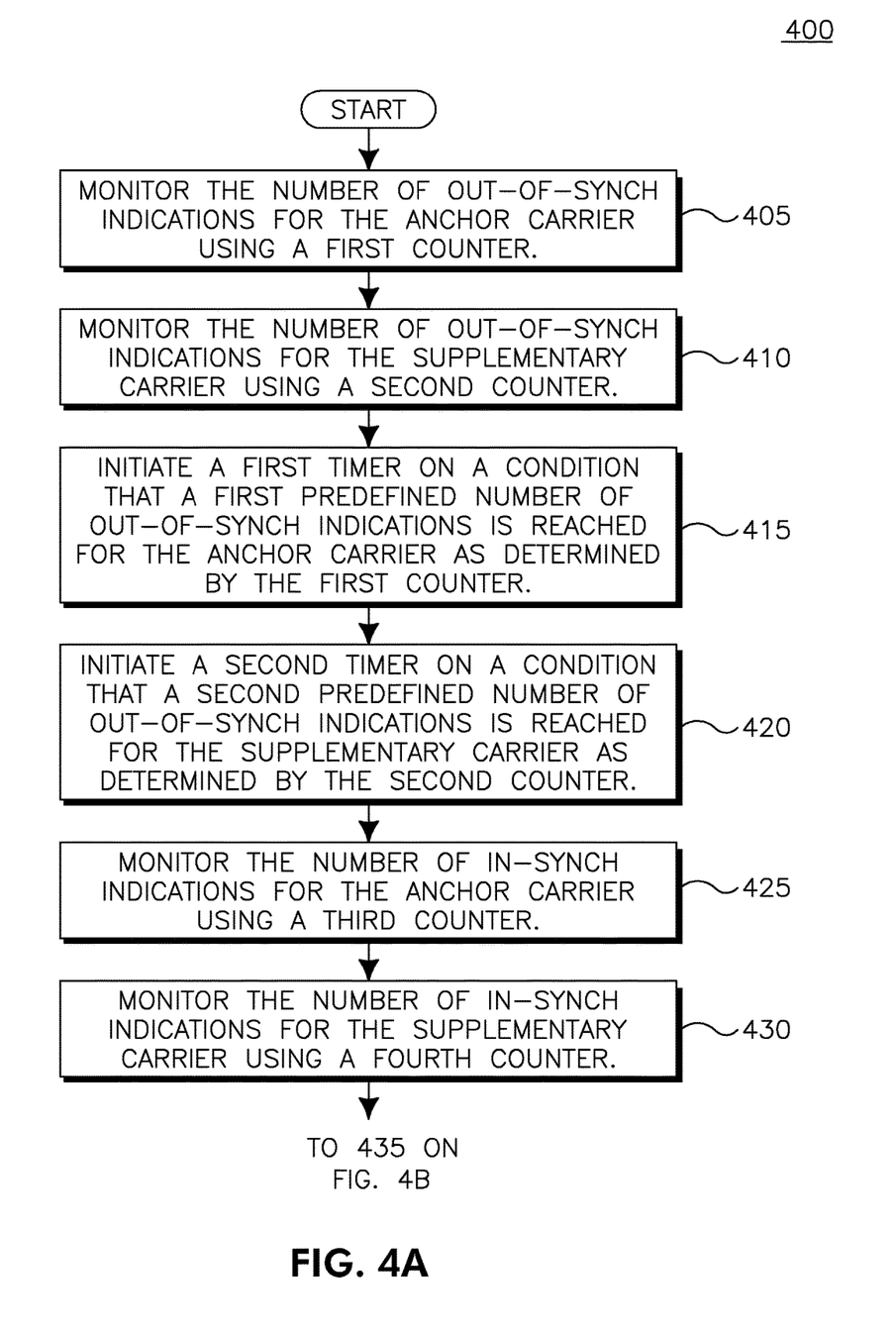
Figure 4B:
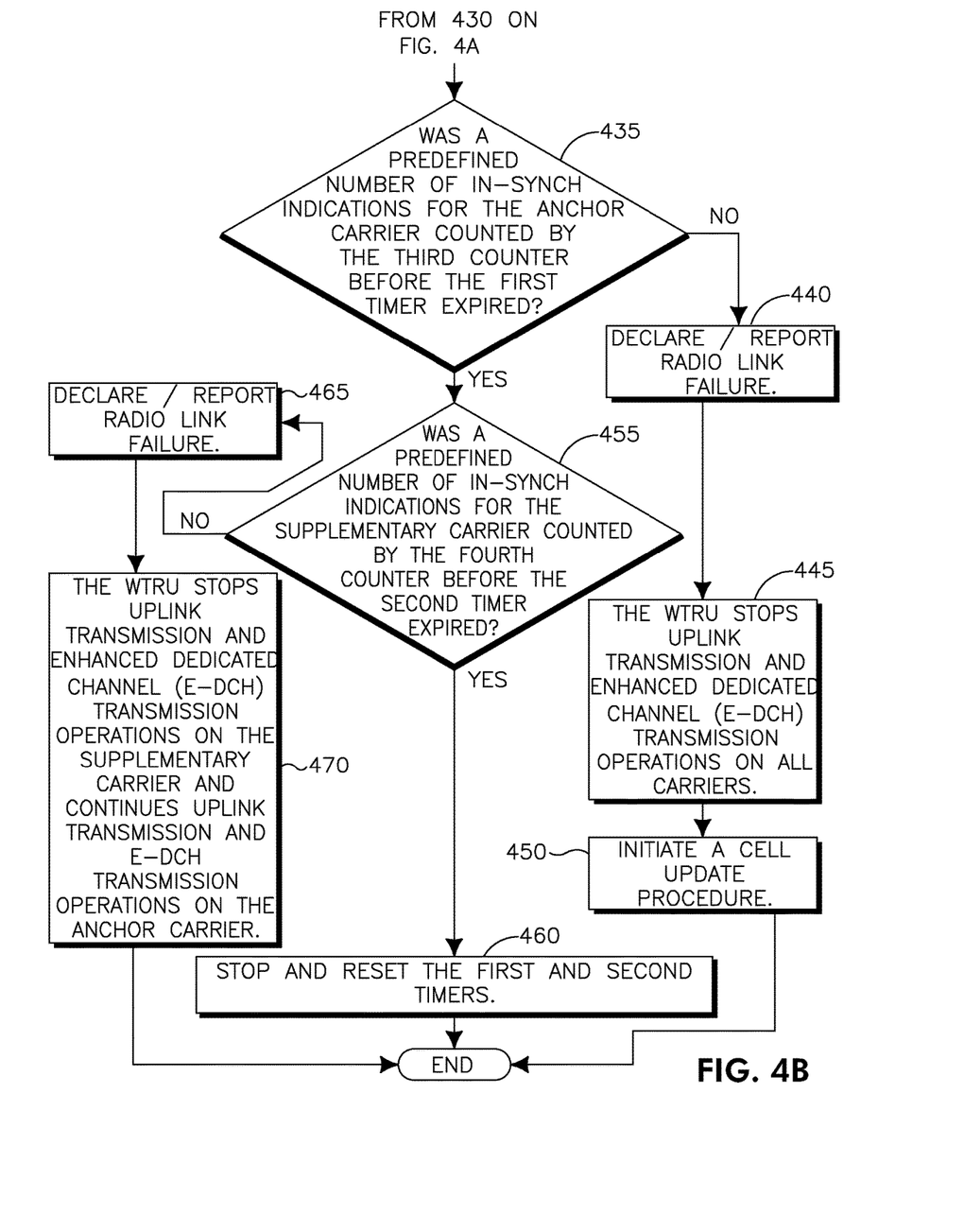

FIGS. 4A and 4B, taken together, is a flow chart for a procedure 400 for monitoring the carriers during a dual-carrier operation. The number of out-of-sync indications is monitored for an anchor carrier using a first counter $130_1$ (405). The number of out-of-sync indications is monitored for a supplementary carrier using a second counter $130_2$ (410). A first timer $125_1$ (e.g., T313 for UMTS or T310 for LTE) is initiated on a condition that a first predefined number of out-of-synch indications (e.g., N313 for UMTS or N310 for LTE) is reached for the anchor carrier as determined by the first counter $130_1$ (415). A second timer $125_2$ (e.g., T313 for UMTS or T310 for LTE) is initiated on a condition that a second predefined number of out-of-synch indications is reached for the supplementary carrier as determined by the second counter $130_2$ (420). A third counter $130_3$ in the WTRU 100 is used to monitor the number of in-synch indications for the anchor carrier (425). A fourth counter $130_4$ in the WTRU 100 is used to monitor the number of in-synch indications for the supplementary carrier (430).

A determination is then made as to whether or not a predefined number of in-synch indications (e.g., N315 for UMTS or N311 for LTE) for the anchor carrier is counted by third counter $130_3$ before the first timer $125_1$ expired (435). If the predefined number of in-synch indications was not reached, a radio link failure is declared/reported (440), the WTRU 100 stops uplink transmission and E-DCH transmission operations on all carriers (445), and a cell update procedure is initiated (450). In an LTE system, the WTRU 100 performs an RRC connection re-establishment procedure, or moves to RRC_IDLE state, depending on whether security has been activated or not.

If the predefined number of in-synch indications was reached, a determination is made as to whether or not a predefined number of in-synch indications (e.g., N315 for UMTS or N311 for LTE) for the supplementary carrier is counted by fourth counter $130_4$ before the second timer $125_2$ expired (455). If the predefined number of in-synch indications was reached, the first timer $125_1$ and the second timer $125_2$ are stopped and reset (460). If the predefined number of in-synch indications was not reached, a radio link failure is declared/reported (465), and the WTRU 100 stops uplink transmission and E-DCH transmission operations on the supplementary carrier, and continues uplink transmission and E-DCH transmission operations on the anchor carrier (470). In an LTE system, the WTRU 100 stops reception of PDCCH on the secondary carrier and continues reception of PDCCH on the anchor carrier.

When there is a radio link failure on one of the carriers, a dependency on the radio link state for the other carrier is introduced for one, or more than one, of the values of the timers, and predefined numbers of out-of-synch and in-synch indications (e.g., N313, N315 and T313). Accordingly, if radio link failure is first determined for one of the carriers, the WTRU 100 may start using different timer and/or indication values to determine radio link failure for the other carrier. This accelerates the determination that there is radio link failure on both carriers.

Use of a single counter 130 of out-of-synch and in-synch indications during recovery phase, and a single recover timer 125 for both carriers, is another possibility for processing the in-synch and out-of-synch indications at the higher layers. The counters are affected (increased) by the indications in-synch or out-of-synch of either carrier, which results in an overall determination of radio link failure considering both carriers.

Alternatively, the WTRU 100 maintains two different counters 130, but the counters (e.g., T313) are started once one or both carriers have reported a predetermined number (e.g., N313) of out-of-synch indications. If at least one of the carriers reports a predetermined number (e.g., N315) of in-synch indications, than the WTRU 100 may continue normal operation and no radio link failure is declared.

Alternatively, the WTRU 100 may declare a higher layer radio link failure if the criteria for radio link failure is fulfilled on the anchor carrier. The WTRU 100 may still keep a count of out-of-synch indications from the supplementary, in order to manage the downlink reception and transmission of data on that carrier. Thus, the higher layers may declare a radio failure even if the criteria on the supplementary carrier are not fulfilled. According to this criteria, the WTRU 100 may declare a higher layer radio link failure if the radio link failure criterion on both carriers is fulfilled.

When radio link failure is determined on either carrier, the WTRU 100 may perform one or more actions including releasing all radio resources on the concerned carrier, stop HS-DSCH reception and enhanced dedicated channel (E-DCH) transmission procedures (if applicable) on the concerned carrier, including HS-DPCCH reporting. If performing the latter, the WTRU 100 may wait for a signal from the network to stop, (e.g., high speed synchronization control channel (HS-SCCH) order on the anchor or supplementary carriers, indication from higher layers, E-DCH absolute channel grant (E-AGCH) with special value of grant and/or grant scope). In an LTE system, the WTRU 100 may stop PDCCH and PDSCH reception on the concerned carrier.

The WTRU 100 may flush and clear the E-DCH and HS-DSCH HARQ entities for the concerned carrier, (if such entities are associated to a specific carrier), or initiate transmission of a measurement report, (if there is at least one carrier for which radio link failure is not determined), including information for at least the carrier, or set of carriers, for which radio link failure is determined. Such information may include, for each carrier for which radio link failure is determined, CPICH energy per chip (Ec)/interference power density (No) or CPICH received signal code power (RSCP), DPCCH transmission power, and/or WTRU power headroom.

In a UMTS or LTE system, inter-frequency measurements are triggered when the serving frequency quality falls below a predetermined threshold. If the network decides that inter frequency measurements need to be performed, the network may send control signaling. An event may also be signaled along with the measurements.

A new event may be defined for the transmission of the measurement report to specifically report the radio link failure on a specific carrier. Alternatively, an existing event may be extended to cover this condition, i.e., the existing event may be triggered using either the criteria of the current system or the additional radio link failure criterion for the carrier.

Alternatively, inter-frequency events may be extended to report that a failure or the quality of the supplementary carrier has fallen below a threshold, while the quality of the other cell is still satisfactory, and, optionally, it is still the best cell in the given frequency. The WTRU 100 may transmit the measurement report using one of the existing RRC protocol mechanisms (i.e., "measurement report" RRC message or "measurement report" information element (IE)), or define a new RRC message specifically for this purpose.

The transmission of scheduling information may be triggered, where the included uplink power headroom (UPH) measurement relates to the remaining carrier. Alternatively, the UPH field carries a special value, (e.g., 0).

The transmission of an indication at layer 2, (e.g., medium access control (MAC) or radio link control (RLC)) that the radio link has failed for the concerned carrier(s) may also be triggered. For example, a special field of the MAC header may be defined and indicated through the use of a special logical channel identity (ID), the use of one of the available spare values of the MAC-I header, or the spare bits following the logical channel identity value 1111. This field may also indicate which carrier or which set of carriers has failed.

A CQI report may be triggered to be transmitted with a special value indicating radio link failure to the network for the concerned carrier(s).

Radio link monitoring may be stopped by the WTRU 100 on the concerned carrier and the determination of radio link failure for the concerned carrier.

Alternatively, stopping reception/transmission procedures on the concerned carrier may be performed by the WTRU 100 once an explicit indication from the network is received.

The WTRU 100 may alternatively release all radio resources on all carriers, even though the radio link failure has occurred on one carrier.

HS-DSCH reception and E-DCH transmission procedures on all carriers may also be stopped upon detection of a radio link failure.

The E-DCH and HS-DSCH HARQ entities for all carriers may be cleared.

The WTRU 100 may initiate a cell update procedure with cause radio link failure generally, and indicates which carrier radio link failure was determined in the cell update message. The WTRU 100 may then move to a forward access channel cell (Cell_FACH), where the dedicated channels are disabled and communications are performed on common channels.

Actions to be Performed Upon Determination of Radio Link Failure for a Carrier Actions may be performed by the WTRU 100 upon determination of radio link failure on the anchor carrier, (if the concerned carrier is an anchor carrier), as described herein below, or on the supplementary carrier, (if the concerned carrier is an anchor carrier).

When radio link failure is determined for both carriers, or if the remaining carrier left for radio link monitoring is determined to be in radio link failure, or if a radio link failure is determined in the anchor carrier, (even if no radio link failure is determined on the supplementary carrier), the WTRU 100 may release all radio resources on all carriers, (or the remaining carrier), and/or stop HS-DSCH reception and E-DCH transmission procedures (if applicable) on all carriers. The WTRU 100 in the latter case may wait for a signal from the network to do so, (e.g., HS-SCCH order on the anchor or supplementary carrier or indication from higher layers).

The WTRU 100 may also flush and clear the E-DCH and HS-DSCH HARQ entities for all carriers, or initiate a cell update procedure with cause radio link failure. The WTRU 100 may indicate which carrier radio link failure was determined for in the cell update message, possibly listing all carriers to which it applies, or alternatively a special value may indicate that radio link failure was determined for all carriers. The WTRU 100 may then move to Cell_FACH or another state.

When the WTRU 100 determines a radio link failure on the supplementary carrier, (i.e., a supplementary radio link failure), the WTRU 100 may suspend E-DCH transmission/reception procedures and optionally HS-DSCH reception on the supplementary carrier. That is, the WTRU 100 may stop transmitting on the secondary uplink frequency and thereby stopping E-DCH operations on that carrier (transmission and reception). Optionally, the WTRU 100 may also suspend HS-DSCH reception on the secondary serving HS-DSCH cell. Rather than clearing all related resources, the WTRU 100 may retain the configuration information for the F-DPCH, E-DCH and HS-DSCH. The WTRU 100 may continue to monitor the F-DPCH in the supplementary carrier in hopes of re-establishing synchronization, optionally for a given period of time. The WTRU 100 may resume uplink operations at a later time when indicated by the network via explicit signaling (e.g., via an RRC message or HS-SCCH order).

In order to determine synchronization re-establishment, the WTRU 100 initiates a new synchronization procedure, or restarts the synchronization procedure A (optionally without post-verification). In one method, the WTRU 100 may initiate this new procedure after a given period of time after the radio link failure. That is, upon radio link failure, the WTRU 100 starts a timer. When this new timer expires, the WTRU 100 initiates the new synchronization procedure. If the WTRU 100 uses the synchronization procedure A, the parameters may be scaled for synchronization reestablishment after a supplementary radio link failure. The parameters for the new synchronization procedure and/or the scaling parameters may be hard-coded, or included as part of the system information.

When the WTRU 100 determines that the radio link failure is on the anchor carrier, the WTRU 100 may request that the supplementary carrier becomes the anchor carrier. This is most relevant in the case where the anchor carrier carries some control information for both carriers, and/or the WTRU 100 sends some control information (for both carriers) on the anchor carrier. Upon detecting the radio link failure, the WTRU 100 may be power controlled on the supplementary carrier and may continue E-DCH and optionally HS-DSCH transmission/reception on this carrier, provided that all the control channels are migrated to this carrier.

The WTRU 100 may then stop transmission and reception on the anchor carrier, and send an indication to the network to promote the supplementary carrier to an anchor carrier. This may be accomplished through the measurement report transmitted in the supplementary carrier (as described above) or through some layer 1 or layer 2 mechanism. The network may then use this as a request to promote the supplementary carrier. The network may then provide the necessary configuration information to the WTRU 100 to set up the missing uplink and downlink control channels on the supplementary carriers.

After the radio link failure, and before the WTRU 100 receives the new control channel information, the WTRU 100 may have to operate in a "transition" mode with a reduced set of E-DCH and HS-DSCH control information. The WTRU 100 may be configured to operate in this mode for a finite time (pre-configured or signaled in system information). If the new control configuration information is not received within the time limit, the WTRU 100 may then declare a radio link failure and continue as described above.

Alternatively, the WTRU 100 may request for a swap of the supplementary carrier and the anchor carrier. If the network accepts the request, then once the configuration information for the new anchor carrier has been received, the WTRU 100 may continue to monitor the quality of the new supplementary carrier, (the original anchor carrier that has undergone a radio link failure), in order to attempt to re-establish synchronization with this carrier. As described above, the WTRU 100 may use a new synchronization procedure or a modified synchronization procedure A.

When the network determines the radio link failure condition on a carrier or set of carriers, either autonomously or through an explicit indication from the WTRU 100, the network may stop scheduling the WTRU 100 on the concerned carriers, disable the concerned carriers, (e.g., by sending an HS-SCCH order or RRC message to deactivate the carriers), or configure the WTRU 100 with another frequency within the same Node-B.

Single Power Control Loops

When there is a single power control loop, (i.e., one pair of F-DPCH and DPCCH channels exchanging transmit power control (TPC) commands), the WTRU 100 may monitor the quality of the (downlink) F-DPCH channel on the anchor cell. However, this provides radio link monitoring for the anchor cell. The WTRU 100 may determine that the radio link is of poor quality on one of the supplementary carrier(s) using one, or a combination of the following criteria: the measured CPICH RSCP on the concerned carrier remains below a threshold for a determined period; the measured CPICH Ec/No on the concerned carrier remains below a threshold for a determined period, the number of failed high speed physical downlink shared channel (HS-PDSCH) protocol data unit (PDU) receptions becomes higher than a threshold, the ratio of failed HS-PDSCH PDU receptions over total HS-PDSCH PDU receptions (HARQ block error rate (BLER)), or a moving average thereof over a determined period, becomes higher than a threshold, and the CQI value falls below a threshold for a determined period or is equal to zero for a determined period.

When one or a combination of the above criteria is met, the physical layer indicates out-of-synch, (or an equivalent indication), to higher layers. Alternatively, the WTRU 100 may directly determine that the radio link of the concerned supplementary carrier has failed without utilizing the in-synch/out-of-synch mechanism.

The WTRU 100 may determine that the radio link is of good quality on one of the supplementary carriers based on one, or a combination, of the following criteria: the measured CPICH RSCP on the concerned carrier remains above a threshold for a determined period, the measured CPICH Ec/No on the concerned carrier remains above a threshold for a determined period, the number of failed HS-PDSCH PDU receptions becomes lower than a threshold, or the ratio of failed HS-PDSCH PDU receptions over total HS-PDSCH PDU receptions (HARQ BLER), or a moving average thereof over a determined period, becomes lower than a threshold.

When one or a combination of the above criteria is met for a carrier, the physical layer indicates in-synch, (or an equivalent indication), to higher layers for the concerned carrier. The WTRU 100 may also send an RRC message indicating that the concerned carrier quality is above a threshold and that it may start reception. Such behavior may be achieved via an extension of existing measurement events. Alternatively, a new measurement event may be defined to allow the WTRU 100 to report to the network that a supplementary carrier CPICH measurement has become above a threshold for a defined period, optionally, while the anchor CPICH quality still ranks the cell as the best cell in the given carrier.

Actions to be Performed Upon Determination of Radio Link Failure or Out-of-Synch with Single Power Control Loop When the WTRU 100 determines that the radio quality of the supplementary carrier, (i.e., the carrier for which no power control loop is active), is poor, the WTRU 100 may report a special value of CQI, (e.g., 0, or 31), for the concerned carrier, or an RRC message may be sent to the network to notify the network that the quality of the supplementary carrier is below a threshold. The notification to the network may be done via the use of a measurement report message. An existing event may be used and extended to indicate that the quality of a supplementary cell has fallen below a threshold. Alternatively, events may be extended to notify the network that the quality of the supplementary carrier has fallen below a threshold while the other frequency is still in its best cell. Another alternative is to define a new event type. These events may be extended to also allow the WTRU 100 to send the RSCP or Ec/No value of the supplementary carrier and anchor carrier, may be triggered while the anchor carrier remains the best cell, but the supplementary carrier CPICH measurement falls below a threshold.

The WTRU 100 may also use layer 2 signaling, (such as the ones indicated above), to indicate that the quality of the supplementary cell is below a threshold.

The WTRU 100, once poor quality is detected on the supplementary carrier, may stop reporting the CQI associated to the concerned carrier (i.e., DTX the appropriate field of the HS-DPCCH), and/or stop reception procedures associated with the concerned carrier.

Alternatively, the reception procedures may be interrupted upon an explicit indication from the network, such as by a RRC message, an HS-SCCH order or a layer 2 message.

In addition, the WTRU 100 may also perform relevant actions disclosed above regarding the actions of WTRU 100 upon determination of a radio link failure for the carrier.

The actions disclosed for single power control loop may also be applicable for dual power control loop operation.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of performing dual-carrier operation, implemented by a wireless transmit/receive unit (WTRU), the method comprising:

performing a physical channel establishment procedure on an anchor downlink carrier associated with an anchor uplink carrier and on a supplementary downlink carrier associated with an activated supplementary uplink carrier, wherein the anchor uplink carrier is a first uplink frequency configured for a transmission of a first serving E-DCH cell corresponding to a serving HS-DSCH cell, and wherein the activated supplementary uplink carrier is a second uplink frequency configured for a transmission of a second serving E-DCH cell that does not correspond to the serving HS-DSCH cell that is transmitted;

declaring a first physical channel establishment failure on the anchor downlink carrier on condition that a first timer expires before a predefined number of in-sync indications is counted by a first counter during the physical channel establishment procedure on the anchor downlink carrier;

declaring a second physical channel establishment failure on the supplementary downlink carrier on condition that a second timer expires before the predefined number of in-sync indications is counted by a second counter during the physical channel establishment procedure on the supplementary downlink carrier;

deactivating the activated supplementary uplink carrier on condition that the second physical channel establishment failure is declared on the supplementary downlink carrier;

ceasing uplink transmission on the activated supplementary uplink carrier on condition that the second physical channel establishment failure is declared on the supplementary downlink carrier;

ceasing reception procedures for a fractional dedicated physical channel (F-DPCH) on the supplementary downlink carrier on condition that the second physical channel establishment failure is declared on the supplementary downlink carrier; and ceasing transmission on an enhanced dedicated channel (E-DCH) on the activated supplementary uplink carrier on condition that the first physical channel establishment failure is declared on the anchor downlink carrier.

2. The method of claim 1, further comprising:
reverting back to a previous configuration on condition that the first physical channel establishment failure is declared on the anchor downlink carrier.

3. The method of claim 1, further comprising:
ceasing enhanced dedicated channel (E-DCH) operations for the activated supplementary uplink carrier on condition that the second physical channel establishment failure is declared on the supplementary downlink carrier.

4. The method of claim 1, further comprising:
stopping and resetting the first timer before the first timer expires on condition that the predefined number of in-sync indications is counted by the first counter; and
stopping and resetting the second timer before the second timer expires on condition that the predefined number of in-sync indications is counted by the second counter.

5. The method of claim 1, further comprising:
receiving the in-sync indications from a layer 1 (L1) entity.

6. A method of performing a dual-carrier operation, implemented by a wireless transmit/receive unit (WTRU), the method comprising:
performing a physical channel establishment procedure on an anchor downlink carrier associated with an anchor uplink carrier and on a supplementary downlink carrier associated with an activated supplementary uplink carrier, wherein the anchor uplink carrier is a first uplink frequency configured for a transmission of a first serving E-DCH cell corresponding to a serving HS-DSCH cell, and wherein the activated supplementary uplink carrier is a second uplink frequency configured for a transmission of a second serving E-DCH cell that does not correspond to the serving HS-DSCH cell that is transmitted;
initiating a first timer on condition that a predefined number of consecutive out-of-sync indications is reached for the anchor downlink carrier;
initiating a second timer on condition that the predefined number of consecutive out-of-sync indications is reached for the supplementary downlink carrier;
stopping and resetting the first timer on condition that a predefined number of in-sync indications is counted for the anchor downlink carrier;
stopping and resetting the second timer on condition that the predefined number of in-sync indications is counted for the supplementary downlink carrier;
declaring a first physical channel establishment failure on the anchor downlink carrier on condition that the first timer expires before the predefined number of in-sync indications is counted for the anchor downlink carrier;
declaring a second physical channel establishment failure on the supplementary downlink carrier on condition that the second timer expires before the predefined number of in-sync indications is counted for the supplementary downlink carrier;
deactivating the activated supplementary uplink carrier on condition that the second physical channel establishment failure is declared on the supplementary downlink carrier;
ceasing uplink transmission and transmission on an enhanced dedicated channel (E-DCH) on the activated supplementary uplink carrier on condition that the second physical channel establishment failure is declared on the supplementary downlink carrier;
ceasing uplink transmission and transmission on the E-DCH on the anchor uplink carrier and the supplementary uplink carrier on condition that the first physical channel establishment failure is declared on the anchor downlink carrier;
ceasing reception procedures for a fractional dedicated physical channel (F-DPCH) on the supplementary downlink carrier on condition that the second physical channel establishment failure is declared on the supplementary downlink carrier; and
initiating a cell update procedure on condition that the first physical channel establishment failure is declared on the anchor downlink carrier.

7. The method of claim 6, further comprising:
receiving the in-sync and out-of-sync indications from a layer 1 (L1) entity.

8. The method of claim 6, further comprising:
ceasing downlink reception and high speed downlink shared channel (HS-DSCH) operations on the anchor downlink carrier and the supplementary downlink carrier on condition that the first physical channel establishment failure is declared on the anchor downlink carrier.

9. A wireless transmit/receive unit (WTRU) for performing a dual-carrier operation, the WTRU comprising:
a processor configured to:
perform a physical channel establishment procedure on an anchor downlink carrier associated with an anchor uplink carrier and a supplementary downlink carrier associated with an activated supplementary uplink carrier, wherein the anchor uplink carrier is a first uplink frequency configured for a transmission of a first serving E-DCH cell corresponding to a serving HS-DSCH cell, and wherein the activated supplementary uplink carrier is a second uplink frequency configured for a transmission of a second serving E-DCH cell that does not correspond to the serving HS-DSCH cell that is transmitted;
declare a first physical channel establishment failure on the anchor downlink carrier on condition that a first timer expires before a predefined number of in-sync indications is counted by a first counter during the physical channel establishment procedure on the anchor downlink carrier;
declare a second physical channel establishment failure on the supplementary downlink carrier on condition that a second timer expires before the predefined number of in-sync indications is counted by a second counter during the physical channel establishment procedure on the supplementary downlink carrier; and deactivate the activated supplementary uplink carrier on condition that the second physical channel establishment failure is declared on the supplementary downlink carrier;

a transmitter configured to:
cease uplink transmission on the activated supplementary uplink carrier on condition that the second physical channel establishment failure is declared on the supplementary downlink carrier; and
cease transmission on an enhanced dedicated channel (E-DCH) on the supplementary uplink carrier on condition that the first physical channel establishment failure is declared on the anchor downlink carrier; and a receiver configured to cease reception procedures for a fractional dedicated physical channel (F-DPCH) on the supplementary downlink carrier on condition that the second physical channel establishment failure is declared on the supplementary downlink carrier.

10. The WTRU of claim 9, wherein the processor is further configured to revert back to a previous configuration on condition that the first physical channel establishment failure is declared on the anchor downlink carrier.

11. The WTRU of claim 9, wherein the transmitter is further configured to cease enhanced dedicated channel (E-DCH) transmission on the supplementary uplink carrier on condition that the second physical channel establishment failure is declared on the supplementary downlink carrier.

12. The WTRU of claim 9, wherein the processor is further configured to:
stop and reset the first timer before the first timer expires on condition that the predefined number of in-sync indications is counted by the first counter, and
stop and reset the second timer before the second timer expires on condition that the predefined number of in-sync indications is counted by the second counter.

13. The WTRU of claim 9, wherein the processor is further configured to receive the in-sync indications from a layer 1 (L1) entity.

14. A wireless transmit/receive unit (WTRU) for performing dual-carrier operation, the WTRU comprising:
a processor configured to:
perform a physical channel establishment procedure on an anchor downlink carrier associated with an anchor uplink carrier and a supplementary downlink carrier associated with an activated supplementary uplink carrier, wherein the anchor uplink carrier is a first uplink frequency configured for a transmission of a first serving E-DCH cell corresponding to a serving HS-DSCH cell, and wherein the activated supplementary uplink carrier is a second uplink frequency configured for a transmission of a second serving E-DCH cell that does not correspond to the serving HS-DSCH cell that is transmitted;
initiate a first timer on condition that a predetermined number of consecutive out-of-sync indications is reached for the anchor downlink carrier;
initiate a second timer on condition that the predetermined number of consecutive out-of-sync indications is reached for the supplementary downlink carrier;
stop and reset the first timer on condition that a predefined number of in-sync indications is counted for the anchor downlink carrier;
stop and reset the second timer on condition that the predefined number of in-sync indications is counted for the supplementary downlink carrier;
declare a first physical channel establishment failure on the anchor downlink carrier on condition that the first timer expires before the predefined number of in-sync indications is counted for the anchor downlink carrier;
declare a second physical channel establishment failure on the supplementary downlink carrier on condition that the second timer expires before the predefined number of in-sync indications is counted for the supplementary downlink carrier;
deactivating the activated supplementary uplink carrier on condition that the second physical channel establishment failure is declared on the supplementary downlink carrier;
initiate a cell update procedure on condition that the first physical channel establishment failure is declared on the anchor downlink carrier;

a transmitter configured to:
cease uplink transmission and transmission on an enhanced dedicated channel (E-DCH) on the activated supplementary uplink carrier on condition that the second physical channel establishment failure is declared on the supplementary downlink carrier; and
cease uplink transmission and transmission on the E-DCH on the anchor uplink carrier and the supplementary uplink carrier on condition that the first physical channel establishment failure is declared on the anchor downlink carrier, and a receiver configured to cease reception procedures for a fractional dedicated physical channel (F-DPCH) on the supplementary downlink carrier on condition that the second physical channel establishment failure is declared on the supplementary downlink carrier.

15. The WTRU of claim 14, wherein the processor is further configured to receive the in-sync and out-of-sync indications from a layer 1 (L1) entity.

16. The WTRU of claim 14, wherein the receiver is further configured to cease downlink reception and high speed downlink shared channel (HS-DSCH) operations on the anchor downlink carrier and the supplementary downlink carrier on condition that the first physical channel establishment failure is declared on the anchor downlink carrier.

17. The method of claim 1, wherein the deactivating the activated supplementary uplink carrier comprises deactivating the activated supplementary uplink carrier as if an HS-SCCH order to deactivate has been received.

18. The method of claim 6, further comprising performing an action in connection with resources associated with the activated supplementary uplink carrier as if an HS-SCCH order to deactivate has been received.

19. The WTRU of claim 9, wherein the processor configured to deactivate the activated supplementary uplink carrier is configured to deactivate the activated supplementary uplink carrier as if an HS-SCCH order to deactivate has been received.

20. The WTRU of claim 14, wherein the processor is further configured to perform an action in connection with resources associated with the activated supplementary uplink carrier as if an HS-SCCH order to deactivate has been received.

* * * * *